Figure 1:
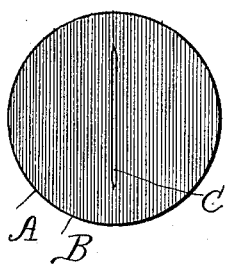

No. 637,955. Patented Nov. 28, 1899.
J. F. BYINGTON.
PHOROMETER.
(Application filed June 2, 1898.)
(No Model.) 3 Sheets—Sheet 1.

Witnesses.
Wm. M. Rheem
J. Cross.

Inventor
John F. Byington
by Gridley & Hopkins
Atty's.

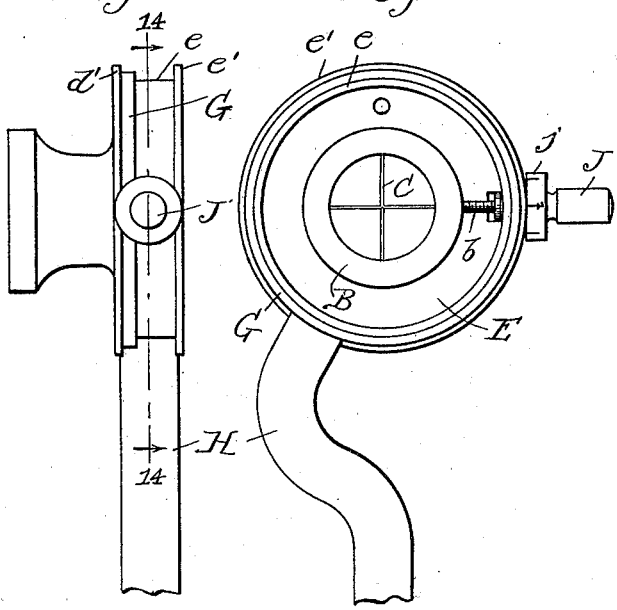

No. 637,955. Patented Nov. 28, 1899.
J. F. BYINGTON.
PHOROMETER.
(Application filed June 2, 1898.)
(No Model.)
3 Sheets—Sheet 3.
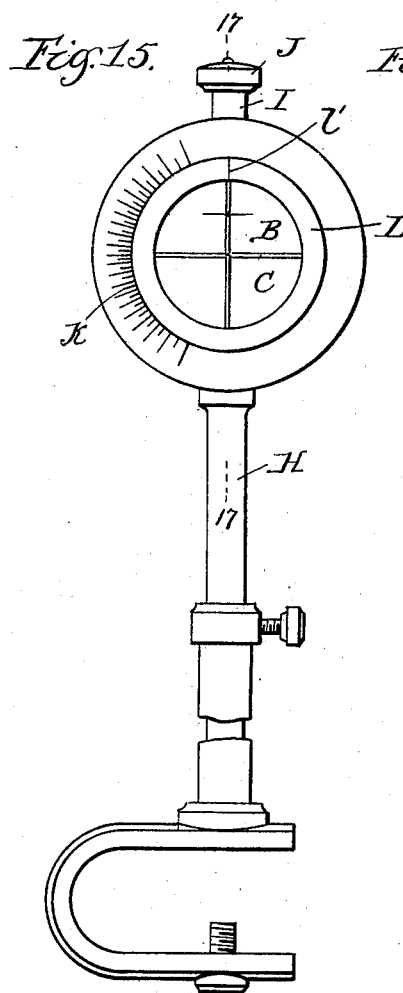
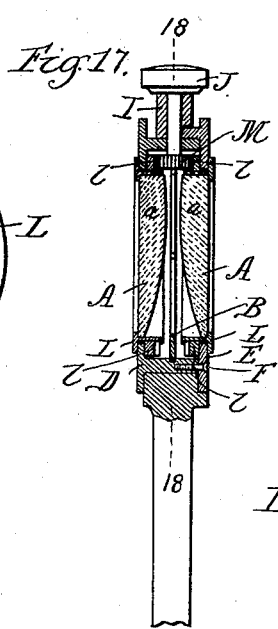
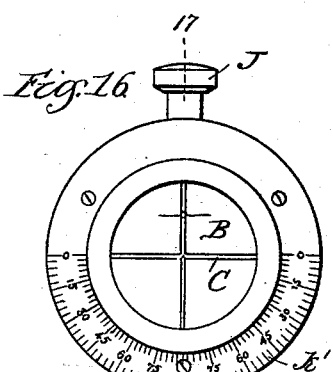
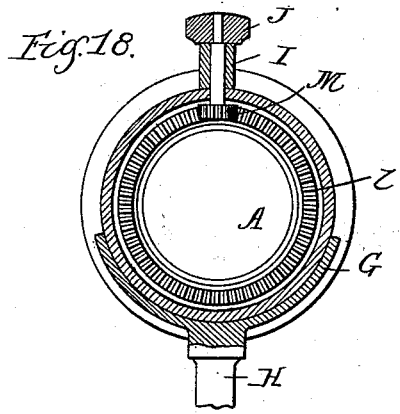
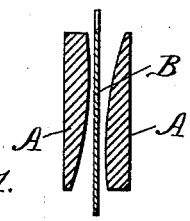
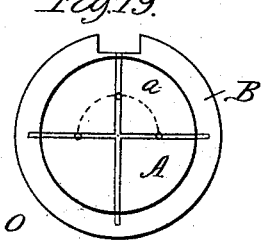
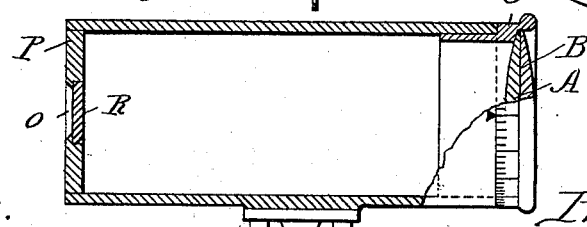
Witnesses.
Inventor
John F. Byington
by Gridley & Hopkins
Att'ys.
THE NORRIS PETERS CO., PHOTO-LITHO., WASHINGTON, D. C.

UNITED STATES PATENT OFFICE.

JOHN F. BYINGTON, OF BATTLE CREEK, MICHIGAN.

PHOROMETER.

SPECIFICATION forming part of Letters Patent No. 637,955, dated November 28, 1899.

Application filed June 2, 1898. Serial No. 682,328. (No model.)

*To all whom it may concern:*

Be it known that I, JOHN F. BYINGTON, a citizen of the United States, residing at Battle Creek, in the county of Calhoun and State of Michigan, have invented certain new and useful Improvements in Phorometers, of which the following is a specification.

The present invention relates to an instrument for testing the condition of the muscular apparatus of the eyes with a view to ascertaining whether or not the muscles are balanced. When a single object—such, for example, as a flame—is viewed with both eyes and between the object and one eye is interposed a medium by which the appearance of the object is transformed, thereby producing in the eyes different images of one and the same object, the ocular muscles which move the eyes take the positions of greatest ease with respect to each other, and the apparent relative positions of the two apparently different objects (or of the two different images of the one object) will indicate the conditions of said muscles, or, in other words, will indicate whether or not the patient undergoing the test has heterophoria. For transforming the appearance of the object in making these tests several devices are already in use, but they are all of a rather crude nature and are open to the serious objection that the oculist must depend upon the patient for all information as to facts actually developed by the test. A familiar instrument used for this purpose consists of a powerful plano-convex lens and a shade consisting of an opaque disk placed against the plane face of the lens and provided with a circular peep-hole or sight located directly opposite the optical center of the lens. When a flame is viewed with one eye through this instrument, the image presented to the eye is a luminous round spot, and the flame itself, which is simultaneously viewed with the other (naked) eye, will appear to be somewhere within the area of the luminous spot. If the muscles are balanced and the patient has no heterophoria, it will appear to be directly in the center, while, on the other hand, if they are not balanced it will appear to be out of the center, its distance and direction from the center depending upon and having a fixed relation to the extent and character of the muscular error. With this instrument the oculist must depend upon the patient for information as to the apparent position of the flame upon the luminous spot, and it is next to impossible for the patient to give this information accurately. Moreover, since the optical center of a plano-convex lens is situated on its convex surface, if the plane surface of the lens is not exactly at right angles to the line of sight the test gives results which are very materially inaccurate. Another familiar instrument consists of a shade (an opaque disk) having in it a straight slot in which is disposed a cylindrical glass rod. With this instrument the flame is transformed into an attenuated luminous streak, which appears to be at right angles to the rod. When the instrument is used with the rod in horizontal position, the luminous streak will be vertical, and the flame simultaneously viewed with the other (naked) eye will appear in some relation to it. If it appears directly on the luminous streak, it indicates that the recti-ocular muscles are balanced; but if it appears at the side of the streak it indicates that there is lateral error, either right or left, according as it appears at the right or left side of the streak. In like manner by placing the instrument with the glass rod in vertical position the superior and inferior ocular muscles are tested for vertical error. The objections to this instrument are that the luminous streak is not well defined and straight, but, on the contrary, it is irregular and ragged. The test requires two operations, and accurate results are not obtainable for the reason already stated, that the patient must do the reading and communicate the result to the oculist.

One object of the present invention is to provide for making these tests an instrument having a transformer that will present to the eye a well-defined image, the boundaries of which are definite and unmistakable, to the end that the apparent relative positions of the flame and the transformed image thereof may be accurately observed by the patient. This object I accomplish by the use of a lens and an opaque shade, which is disposed opposite the lens and has a straight "sight" disposed in a line which normally passes through the optical center of the lens. The invention is not limited to a shade of any particular character further than that it shall shade all portions of the lens excepting directly opposite the so-called "sight." It may consist of a film of paint or other opaque substance applied directly to one face of the lens, or it may consist of a stain applied to the lens, or it may consist of a disk of metal or other material secured directly to the lens or supported opposite one of its faces. In fact any means for shading the lens is within the scope of the invention. Nor is the invention limited to a lens of any particular character. It may be a single simple lens or a compound or composite lens, and in the latter case the individual lenses going to make up the compound or composite lens may be permanently secured together or independently supported. Nor is it limited to either a fixed or a movable relation between the lens and shade, both relations being within the scope of the invention, generically considered. Nor is it limited to the character of the sight further than that it shall be disposed in a straight line or in straight lines. The sight may be in the nature of a continuous uninterrupted break or slot in the shade, having parallel sides, or it may be in the nature of a series of small holes disposed in a straight line. Again, it may consist of a single branch or of two branches crossing each other at right angles, with their intersection disposed normally opposite the optical center of the lens.

Another object of the invention is to provide an instrument by which the nature of the error, whether it be lateral or vertical error, right or left, upward or downward, or any possible combination of them, is definitely indicated at a glance. This object I accomplish by the use of a shade having a sight composed of the two arms or branches above described. A transformer of this description will present to the eye an image comprising two well-defined straight luminous streaks intersecting each other at right angles, forming a cross. With such a transformer the apparent position of the flame with relation to the intersecting luminous streaks fully indicates the conditions of the muscles. If the muscles are normal, the flame will appear to be directly at the intersection of the two streaks, and if there is error it will appear to be at a distance from the intersection. It might appear directly on the vertical streak and at a distance from the horizontal streak, thus indicating that there is vertical error, but no lateral error, and indicating, further, that the error is either upward or downward, according as the flame appears to be above or below the horizontal streak, or it may appear directly on the horizontal streak and at a distance from the vertical streak, thus indicating that there is lateral error, but no vertical error, or it may appear in one of the quadrants, thus indicating both vertical and lateral error, and indicating, further, (by the position of the quadrant in which it appears,) whether the error is upward or downward, right or left.

Another object of the invention is to provide means for measuring and indicating the amount of the error, the measurement being indicated upon a suitable scale in equivalents of the prism necessary to correct the error, and to provide, further, means for indicating upon a suitable scale the angle at which the base of the correcting-prism must be placed.

The invention consists in the features of novelty herein described.

Figure 2:
Figure 3:
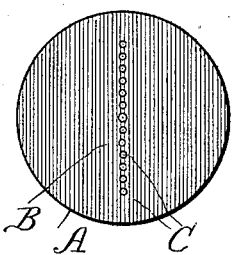
Figure 4:
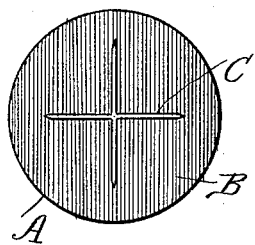
Figure 5:
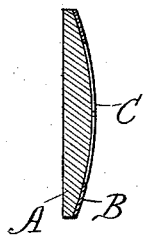
Figure 6:
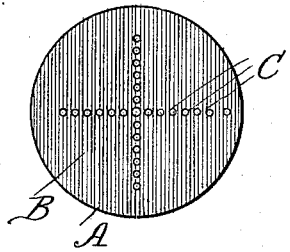
Figure 7:
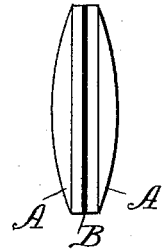
Figure 8:
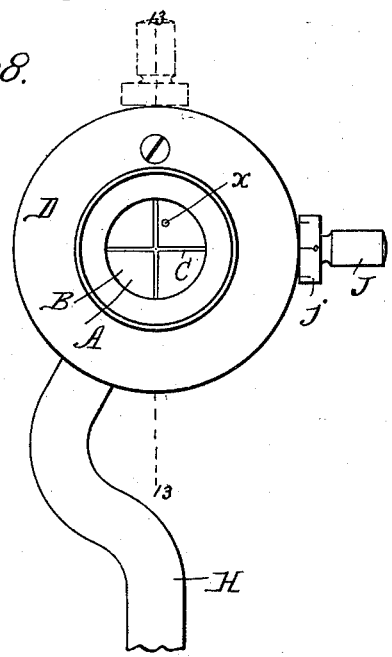
Figure 9:
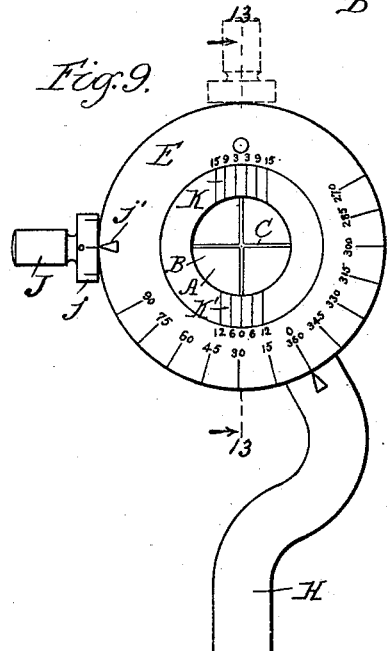

In the accompanying drawings, which are made a part of this specification, Figures 1 and 2 are respectively a face view and an axial section of a transformer embodying some features of the invention. Fig. 3 is a face view of a modification thereof. Figs. 4 and 5 are respectively a face view and an axial section of another modification thereof. Fig. 6 is a face view of still another modification thereof. Fig. 7 is an edge view of still another modification thereof. Still other modifications of this transformer are incorporated in the instrument shown in the succeeding figures. Figs. 8 and 9 are elevations of a phorometer embodying the invention in its preferred form, the instrument as seen in these figures being viewed from its front and rear sides, respectively. Fig. 10 is a side elevation thereof. Fig. 11 is an elevation of a portion thereof, the remaining portion being shown in elevation in Fig. 12. Fig. 13 is a section thereof on the line 13 13, Figs. 8 and 9, viewed in the direction of the arrow, Fig. 9. Fig. 14 is a section thereof on the line 14 14, Fig. 10, viewed in the direction of the arrow. Figs. 15 and 16 are elevations, viewed from the opposite faces, of a phorometer of modified form embodying some features of the invention. Fig. 17 is a section thereof on the line 17 17, Figs 15 and 16. Fig. 18 is a section thereof on the line 18 18, Fig. 17. Fig. 19 is an elevation of the transformer used in this instrument. Fig. 20 is an axial section thereof. Fig. 21 is a section of a phorometer of still another modification embodying some features of the invention.

A represents a lens, shown in the drawings as being plano-convex, and B an opaque shade, which shades the lens excepting upon the line or lines C, where it is interrupted, this interruption being herein termed the "sight." The shade may consist of a stain or coloring-matter applied directly to the surface of the lens, or it may be made by grinding the surface of the lens or subjecting it to a sand-blast, whereby it is rendered more or less opaque, these ideas being illustrated in Fig. 2, where only a single thickness is shown; or the shade may consist of a film of paint or similar substance applied directly to the face of the lens, or it may consist of a thin sheet of metal or other material. When made of sheet material, it may be applied directly to the face of the lens, as shown in Fig. 5, or it may be incorporated in the lens, as shown in Fig. 7, or it may be independently supported opposite the lens, as shown, for example, in Figs. 13 and 17. The lens may be a simple lens, as shown in Figs. 2 and 5, or it may be a compound lens, as shown in Figs. 7, 13, and 17. When the lens is compound, the shade may be placed between the plane surface of the individual lenses, as shown in Fig. 7, or between the convex surfaces, as shown in Figs. 13 and 17. The sight may be in the nature of a continuous slot having parallel sides, as shown in Figs. 1, 4, 11, and 19, or it may be in the nature of a series of perforations, as shown in Figs. 3 and 6. It may comprise only a single straight branch or arm, as shown in Figs. 1 and 3, or it may comprise two such branches or arms intersecting each other at right angles, as shown in Figs. 4, 6, 11, and 19, and in this latter case, in order to produce a transformed image in the form of a cross, the curved surface or surfaces of the lens must be spherical. The shade may bear a permanently-fixed relation to the lens, as shown in Figs. 1 to 6, inclusive, or it may be relatively movable, as shown in Figs. 8 to 20, inclusive.

For the purposes of this specification I have applied the term "transformer" to the device shown in Fig. 1 and the several modifications thereof; but I desire to have it understood that said device and the modifications thereof that are shown in Figs. 3 to 7 may, without any additional part or parts, be used for making the tests and will give more or less satisfactory results, the additional mechanism shown in Figs. 8 et seq. being added simply for the purpose of accurately manipulating the so-called "transformer" and for indicating the results of such manipulation upon a scale in order that more accurate readings may be had. The instrument shown in Figs. 1 and 2 may be used for making tests precisely in the manner that the instrument above described having the glass rod is used, and the only advantage of the instrument shown in Fig. 1 over the instrument having the rod is that the instrument shown in Fig. 1 will produce in the eye an image having a more definite outline. The image presented to the eye will be a straight clear-cut luminous streak. The instrument is used with the sight in vertical position for testing one set of muscles and with the sight in horizontal position for testing the other set of muscles. The instrument shown in Fig. 3 may be used in precisely the same manner, and the advantage which it possesses over the instrument shown in Fig. 1 is that the series of perforations enables the patient to more definitely estimate the apparent distance of the flame from the optical center, which, as shown, is distinguished by some suitable means—as, for example, a larger perforation. With this instrument the patient may count the number of luminous spots between the spot representing the optical center and the flame as seen with the naked eye, and as the intervals between the spots of light represent equivalents in prismatic effect the patient is enabled to give the oculist more definite information than would be possible with the instrument shown in Fig. 1. With the instrument shown in Figs. 4 and 5 the optical center is represented by the intersection of the two luminous streaks, and the advantage of the two intersecting streaks is that it enables the test for both sets of muscles to be made at a single operation. The instrument shown in Fig. 6 combines the advantages of the instrument shown in Figs. 3 and 4.

As before stated, the shade may be at one side of a simple lens; but it is preferable to place it in the center of a composite lens, because by so doing the luminous streak passes directly through the optical center of the lens and the liability to error resulting from a canting or displacement of the lens from a plane which is perpendicular to the line of vision is entirely obviated.

The mechanism hereinafter described is for the purpose of supporting and holding the so-called "transformer" while in use and for measuring and indicating upon a suitable scale the character and amount of the error. In order to do this, it is necessary that the lens and shade be so movable relatively to each other that the sight and optical center of the lens may be moved relatively to each other for the purpose of varying the relative positions of the transformed image and the optical center of the lens. It is also necessary that a suitable scale be provided for indicating in prismatic effect the extent of their relative movement. In practice I prefer to so mount the lens and shade in their supporting-frame that the lens occupies a permanently-fixed position with relation to the frame, while the shade is movable, this arrangement being shown in Figs. 8 to 14, inclusive; but this arrangement is not essential and, if desired, the reverse arrangement may be used, as shown in Figs. 15 to 20, inclusive.

In the preferred form the frame consists of a pair of rings or annular disks D and E, one of which—E, for example—has an annular flange $e$, embracing and fitting snugly a boss $d$, formed on the other, the two being secured together by means of a screw F. The two rings have also radial flanges $d'$ and $e'$, respectively, between which the flange $e$ is embraced by a ring G, permanently secured to a stem H, which is intended to be fitted to a suitable support. Throughout slightly more than one hundred and eighty degrees of its circumference the ring G is reduced in thickness, as shown in Figs. 13 and 14, to permit the passage of a tubular stem I, which projects from the flange $e$, as shown more clearly in Fig. 14, to the end that the frame, comprising the rings D and E, may be partially rotated within the ring G. The boss $d$ of the ring D is provided with a diametrically-disposed groove $d''$, resulting in shoulders $d^2$, and in this groove fits the shade B, the shoulders $d^2$ constituting guides for confining the shade to movement in a straight line. The shade is provided with a threaded stem $b$, which occupies a threaded bore in a thumb-nut J, swiveled in the stem I, so that by rotating the thumb-nut the shade may be moved with relation to the lens A. In this form of the invention the lens is a compound one, consisting of two plano-convex spherical lenses, each secured to one of the two rings D and E. Upon the face of the ring E is disposed a scale the gradations of which are disposed upon opposite sides of the opening of the ring, as shown at K and K', respectively. The scale is double, reading both ways from zero, which is placed in the center of it, and the gradations upon opposite sides of the opening of the ring alternate. The gradation representing zero falls in a line which passes through the optical center of the lens, and in the normal position of the shade the sight (or one arm of it, if it be provided with more than one arm) falls directly opposite zero. The nut J is also graduated, as shown at $j$, and these gradations are read in conjunction with a fixed point $j'$ on the frame, thus forming a micrometer-gage, the gradations $j$ and K K' being so disposed that K K' are multiples of the sum total of $j$. In using this instrument the transformer will operate precisely in the manner already described. Let it be supposed that with the parts in the positions shown the patient undergoing the test sees the flame with the naked eye in the position indicated at $x$ in Fig. 8, indicating both vertical and lateral error. In order to measure and read off on the scales the extent of this error, the thumb-nut J is turned until the vertical luminous streak is made to intersect the flame. The extent of the lateral error may then be read upon the scales $j$ K K'. The frame is then given a quarter-turn in the ring G, bringing it to the position indicated by dotted lines in Figs. 8 and 9. The thumb-nut is then again turned until the horizontal luminous streak intersects the flame, and the extent of the vertical error is read off as before. In this instrument it is not necessary that the sight have two intersecting arms, as shown, since the one which is at right angles to the direction of movement is the one by which the work is really done, but it is preferable that it have two arms or branches, because the two arms or branches will enable the patient to instantly locate the flame, and thereby lessen the work of adjusting the instrument to get the readings. If the sight had only a single branch or arm made up of a row of openings, as shown in Fig. 3, disposed at right angles to the line of movement, the reading could be had by a single adjustment. In this case the shade would be adjusted until the luminous streak (or row of luminous spots) coincided with the flame, thus indicating the error in one direction, and it would then be necessary for the patient to count the number of spots between the optical center and the flame in order to ascertain the error in the other direction.

In the form of the invention shown in Figs. 15 to 20, inclusive, the shade B occupies a permanently-fixed relation to the frame, and the two parts of the compound lens are mounted, respectively, in rings L, that are capable of rotation, each ring being provided on its inner face with an annular rack $l$, and with these racks meshes a pinion M, carried by a shaft, which passes through the stem I and is provided with a thumb-nut J, so that by turning the thumb-nut the two parts of the compound lens are rotated in opposite directions. Strong circular planoconvex lenses are used, and each is decentered to the same extent, so that their optical centers $a$ lie between their geometrical centers and their margins, the distance depending on the strength of the lenses and the scope of the instrument. In the positions in which they are shown in Figs. 15, 16, and 17 the optical centers of the lenses are at the zenith of their permitted movement, and both lie opposite the vertical arm or branch of the sight. A mark $l'$ on one of the rings L indicates the extent to which the compound lens is decentered, and, as shown in Figs. 15, 16, and 17, it is decentered to the maximum extent in an upward direction. If the thumb-nut be turned so as to rotate the lenses in opposite directions, the optical center of the compound lens will approach the geometrical center and will be at the geometrical center when the optical centers of the two lenses composing the compound lens are at the maximum distance apart, as indicated in Fig. 19 and shown in Fig. 20. By continuing the movement the optical center of the compound lens will move downward, always following the vertical branch or bar of the sight, until it reaches the maximum in a downward direction. The normal condition of this instrument is with the optical center of the compound lens at the geometrical center, or opposite the intersection of the two arms or branches of the sight, and by moving in the manner above described the optical center toward and from the geometrical center the flame may be made to appear to approach or to depart from the intersection of the two luminous streaks of the image. With this instrument if the flame appears to be in one of the quadrants formed by the intersecting luminous streaks the frame is rotated in the supporting-ring until one of the intersecting streaks passes through the flame. The thumb-nut is then turned until the flame reaches the intersection of the two streaks, whereupon the number of degrees of error is read off on the scale $k$, and the angle at which the base of the correcting-prism should be placed is read off on the scale $k'$.

In the instrument shown in Fig. 21 the transformer is made as shown in Figs. 6 and 7—that is to say, it has a compound lens consisting of two plano-convex lenses placed with their plane faces together and with an interposed shade having a sight consisting of intersecting rows or lines or perforations, the distance between adjacent perforations corresponding to the amount of decentering of the compound lens, above described, necessary to give a prismatic effect of one degree. The compound lens in this instrument is weaker than that in the instrument shown in Figs. 15 to 20, inclusive, and in order to facilitate the finding of the focus by the patient the lens is placed in the end of a tube or cylinder N, whose length is nearly equal to the focal length of the compound lens. The lens is mounted in rotatable ring O, which is made to fit into the end of the cylinder. The amount of rotation is indicated in degrees on a scale on the periphery of the ring by a mark on the cylinder. The end of the tube opposite the lens is closed by a cap P, having a sight-hole Q in its center. Before the sight-hole a circular disk R of plain red glass is mounted in a depression in the inner face of the cap. To use this instrument, the tube is adjusted both vertically and horizontally, so that the image of the cross streaks is focused upon the red glass at the sight-hole. The instrument is then placed before the patient, as before described, and the patient reads off the number of degrees of error by counting the number of luminous spots from the intersection of the two rows to the spot nearest the flame. The angle at which the base of the correcting-prism should be placed may be read on the scale on the ring O after the lens has been adjusted to bring the transformed image or one branch of it to a position crossing the flame.

Having thus described my invention, the following is what I claim as new therein and desire to secure by Letters Patent:

1. A transformer for phorometers having a lens and an opaque shade, said shade having a sight disposed in a straight line crossing the optical center of the lens, whereby a flame viewed through it appears to be transformed and presents to the eye an image corresponding to the shape of the sight, substantially as set forth.

2. A transformer for phorometers having a lens with a spherical surface and an opaque shade, said shade having a sight comprising two straight arms or branches disposed at right angles to each other and intersecting each other in line with the optical center of the lens, whereby a flame viewed through it appears to be transformed and presents to the eye an image corresponding to the shape of the sight, substantially as set forth.

3. A transformer for phorometers having a lens and an opaque shade, said shade having a sight comprising a series of perforations disposed in a straight line crossing the optical center of the lens, substantially as set forth.

4. A transformer for phorometers having a lens with a spherical surface and an opaque shade, said shade having a sight comprising a number of perforations disposed in two straight rows at right angles to each other, intersecting each other at the optical center of the lens, substantially as set forth.

5. A transformer for phorometers having a compound lens and an opaque shade, said shade being between the primary lenses and having a sight passing directly through the optical center of the lens, substantially as set forth.

6. In a phorometer, the combination with a transformer having a lens and an opaque shade having a sight, said lens and shade being movable relatively to each other for the purpose of varying the relative positions of the sight and optical center of the lens, of means for supporting and relatively moving the lens and shade, substantially as set forth.

7. In a phorometer, the combination with a transformer having a lens and an opaque shade having a sight, said lens and shade being movable relatively to each other for the purpose of varying the relative positions of the sight and optical center of the lens, of means for supporting and relatively moving the lens and shade, and means for indicating the extent of such relative movement, substantially as set forth.

8. In a phorometer, the combination with a transformer having a lens and an opaque shade having a sight, of a frame in which the lens and shade are mounted, the lens fixedly and the shade movably, means for moving the shade, and means for indicating the extent of the movement, substantially as set forth.

9. In a phorometer, the combination with a transformer having a lens and an opaque shade having a sight, of a frame in which the lens is fixedly mounted and the shade movably mounted, a guide for confining the shade to movement in a straight line and means for indicating the extent of the movement, substantially as set forth.

10. In a phorometer, the combination with a transformer having a lens and an opaque shade having a straight attenuated sight, of a frame in which the lens and shade are mounted so as to be relatively movable for the purpose of varying the relative positions of the sight and optical center of the lens, means for relatively moving the lens and shade in a direction at right angles to the length of the sight, and means for indicating the extent of the movement, substantially as set forth.

11. In a phorometer, the combination with a transformer having a lens and an opaque shade having a straight attenuated sight, of a frame in which the lens and shade are mounted so as to be relatively movable in a direction at right angles to the length of the sight for the purpose of varying the relative positions of the sight and optical center of the lens, means for indicating the extent of the relative movement, and means for supporting the frame whereby it may be rotated, substantially as set forth.

12. In a phorometer, the combination with a transformer having a lens and a shade having a straight attenuated sight, of a frame consisting of two rings D and E in which the lens is fixedly mounted and in which the shade is movably mounted, means for guiding the shade in its movement, a threaded stem carrying the shade, a nut turned onto the threaded stem and swiveled to the frame, and means for indicating the extent of the movement of the shade, substantially as set forth.

JOHN F. BYINGTON.

Witnesses:
W. W. CLEMENTS,
T. H. PATTERSON.